(12) United States Patent
Cook et al.

(10) Patent No.: US 10,035,084 B2
(45) Date of Patent: Jul. 31, 2018

(54) DE-AERATION SYSTEM AND METHOD

(71) Applicant: Cook and Cook Incorporated, Fullerton, CA (US)

(72) Inventors: Wallace Cook, Fullerton, CA (US); Federico Robles, Fullerton, CA (US)

(73) Assignee: Cook and Cook Incorporated, Fullerton, CA (US)

( * ) Notice: Subject to any disclaimer, the term of this patent is extended or adjusted under 35 U.S.C. 154(b) by 117 days.

(21) Appl. No.: 15/147,281

(22) Filed: May 5, 2016

(65) Prior Publication Data
US 2017/0319986 A1    Nov. 9, 2017

(51) Int. Cl.
*B01D 19/00* (2006.01)

(52) U.S. Cl.
CPC ................................ *B01D 19/0052* (2013.01)

(58) Field of Classification Search
CPC ...................................... B01D 19/00–19/0495
USPC .............. 95/156–186, 241–266; 96/155–220
See application file for complete search history.

(56) References Cited

U.S. PATENT DOCUMENTS

| | | | |
|---|---|---|---|
| 2,060,242 A * | 11/1936 | Pulley | B01D 19/0047 96/196 |
| 2,070,453 A | 2/1937 | Rodman | |
| 2,507,797 A | 5/1950 | Martin | |
| 3,254,877 A | 6/1966 | Goodwin | |
| 3,769,779 A * | 11/1973 | Liljestrand | B01D 19/0047 96/161 |
| 3,928,003 A | 12/1975 | Fryar | |
| 4,427,421 A | 1/1984 | Jensen et al. | |
| 4,604,109 A | 8/1986 | Koslow | |
| 4,908,048 A | 3/1990 | Hofmann et al. | |
| 5,277,691 A | 1/1994 | Eaton et al. | |
| 5,833,363 A | 11/1998 | Gmeiner | |
| 6,001,189 A * | 12/1999 | Rolfson | B01D 19/0036 134/10 |
| 6,033,475 A | 3/2000 | Hasebe et al. | |
| 7,267,529 B2 | 9/2007 | Taylor | |

(Continued)

FOREIGN PATENT DOCUMENTS

| | | |
|---|---|---|
| DE | 2 259 740 | 6/1974 |
| DE | 27 15 444 | 10/1978 |

(Continued)

OTHER PUBLICATIONS www.cornellmachine.com/versator-operation.html, The Cornell Machine Company, Versator Operation & Process Actions, Sep. 21, 2015, 1 page.

(Continued)

*Primary Examiner* — T. Bennett McKenzie
(74) *Attorney, Agent, or Firm* — Maceiko IP (57) ABSTRACT

The invention relates generally to a de-aeration apparatus and system, and more particularly, to an apparatus and system suitable for de-aerating highly viscous fluids comprising a vacuum chamber, an annular disk for rotating within the chamber, and a fixed baffle covering a portion of the surface of the annular disk and thereby defining a predetermined path by which the fluid to be de-aerated is spread more quickly into a thinner layer on the disk, exposing a greater amount of air/gas bubbles from the fluid in a shorter amount of time and resulting in a higher quality product than conventional de-aeration systems allow.

20 Claims, 8 Drawing Sheets

(56) References Cited

U.S. PATENT DOCUMENTS

| | | |
|---|---|---|
| 7,588,631 B2 | 9/2009 | Hoffman |
| 2008/0166488 A1* | 7/2008 | Vatanen ............. B01D 19/0026 |
| | | 427/420 |
| 2010/0139490 A1 | 6/2010 | Hefner et al. |
| 2011/0219853 A1* | 9/2011 | Henderson ......... B01D 19/0052 |
| | | 73/23.2 |
| 2012/0106288 A1 | 5/2012 | Harada |

FOREIGN PATENT DOCUMENTS

| | | |
|---|---|---|
| DE | 10 2010 043 756 A1 | 5/2012 |
| GB | 1 257 173 | 12/1971 |
| WO | WO 2008/028722 | 3/2008 |
| WO | WO 2009/033938 | 3/2009 |

OTHER PUBLICATIONS

FrymaKoruma AG, FrymaKoruma technology in motion, FrymaKoruma Vacuum Deaerator, Dec. 31, 2015, 4 pages.
www.kma-process.de/en/products-vacuum-deaertors.php, K-Process Kaltenbach GmbH, K-Process, Vacuum deaerator K-VE, Sep. 21, 2015, 3 pages.
Omve Netherlands B.V., DEA220 & DEA320: Inline De-aerators, Deaerates and Degases, Dec. 31, 2015, 2 pages.

* cited by examiner

DE-AERATION SYSTEM AND METHOD

FIELD OF THE INVENTION

The invention relates generally to a de-aeration or degassing system and method, including systems and methods for de-aerating or degassing viscous fluids and other materials.

BACKGROUND OF THE INVENTION

Many products in the chemical, pharmaceutical, food, nutritional supplement, cosmetic and related industries consist of viscous or highly viscous fluids or materials such as gels, emulsions, suspensions, pastes and the like. Such materials may be manufactured for use in end products such as gelatin used for capsules, lotions, cream, epoxy and other products.

During the manufacture of these materials, dissolved air and/or gas(es) may exist in and/or may be formed in the material in the form of small air pockets, micro bubbles and other voids which are not desirable in the end product. For example, gas bubbles present in such materials may impair the quality, appearance, flavor and/or aroma of the end product, may inhibit consistent filling or dosing of the product into a container and/or may undesirably promote aging and/or spoiling of the product.

In order to prepare such materials as an end product, systems and methods have been developed to de-aerate, degas or otherwise remove such air pockets, micro bubbles or other voids. Conventional processes and equipment for de-aerating such materials have operated by feeding the material into a vacuum chamber and onto a centrifuge plate rotating in the vacuum chamber. Through the centrifugal force imparted by the rotation of the plate, the material is directed radially outward, and air bubbles or other voids may be brought to the surface of the material, thereby exposing bubbles or voids to the vacuum environment. Under the vacuum action in the vessel created by a vacuum pump, exposed air bubbles or voids may stretch, burst and are removed by the vacuum.

However, conventional de-aeration or degassing systems and methods may not efficiently and effectively remove air bubbles and other voids from the material. For example, the amount of time the material remains on the rotating plate is often insufficient to bring all or substantially all of the air bubbles or voids to the surface of the film. Accordingly, many prior de-aeration systems and methods require longer processing times and larger diameter centrifuge plates. This increases manufacturing time and cost.

Furthermore, regardless of any increase in the time for the de-aeration process, many existing systems still do not effectively remove sufficient air bubbles or voids to ultimately provide a quality end product. For example, various existing systems do not form a thin layer of material to facilitate bringing air bubbles or voids to the surface where they may be exposed to and removed by the vacuum. Where material is simply directed radially outward but not sufficiently thinned, air bubbles and voids may not reach the surface and thus remain in the end product and degrade its quality.

Another drawback of existing systems relates to their difficulty to clean. For example, certain existing systems may rely on squeezing material through a gap with prior sufficient thinning of the material layer. These types of systems are difficult to clean.

Existing systems may also not be dynamically balanced so that as they rotate, they wobble. This may decrease degassing efficiency and also cause damage to, or shorten the life of, the system.

Existing systems may also be insufficiently sealed, especially near where a rotating shaft engages the stationary chamber. This may result in loss of vacuum, leaks, lower efficiency and increased maintenance costs.

Accordingly, there is a need for an improved de-aeration or degassing system and method that more efficiently and effectively removes a greater amount of air bubbles or other voids from viscous or highly viscous liquids and other materials in a shorter amount of time than required by existing devices. There is also a need for a system that is easier to clean. There is also a need to provide higher quality end products for packaging and end use. The current invention addresses the foregoing and other drawbacks and issues associated with existing de-aeration devices.

SUMMARY OF THE INVENTION

In an aspect of the invention, a de-aeration or degassing system is described which operates by feeding material to be de-aerated or degassed, into a vacuum chamber that includes a rotating disk and a fixed baffle on scraper ring. The disk and baffle may define a compartment within the vacuum chamber in which material is fed. The baffle may cover a portion of the disk so that the disk extends radially beyond the baffle. A gap preferably exists between the disk and baffle or scraper ring. Through the centrifugal force imparted by the rotating disk, the material extends radially outward, and spreads out in a thin layer or film on the disk.

The centrifugal force also preferably causes the film or layer of material to radially extend further outward on the disk towards the fixed baffle or scraper ring so that material passes through the gap. It is preferred that the rotating disk be dimensioned so that the material may be sufficiently thinned as it approaches the baffle and gap. The material passing through the gap preferably forms a layer or film of material on the outer radial portion of the disk, which layer or film may be refined and/or thinner than the layer or film located radially inward of the gap. As the material passes through the gap, bubbles and/or other voids may rise and/or be exposed to the surface of the layer or film. The fixed baffle or scraper ring preferably exerts a shearing action on the material as it passes through the gap, thereby increasing the efficiency of removing bubbles and voids from the material by the vacuum. As such, the fixed baffle or scraper ring and gap, with the rotating disk, improves the de-aeration or degassing of material.

In another aspect of the invention, the rotating disk may be dynamically balanced to increase efficiency and uniformity of the de-aerated material, and to improve durability of the system. For example, the balance of the rotating disk may be tested while rotating, and material comprising the disk may be removed so that its mass is uniform around the rotating shaft to which it is mounted. Alternatively, material from a hub or attachment plate may be removed for dynamic stability. This may occur by suitable machining operations.

In another aspect of the invention, the baffle covering a portion of the rotating disk, and the gap between the disk and baffle, may direct the material along a predetermined path so that the material may spread out more quickly and/or more efficiently into a thinner layer on the disk, thereby exposing a greater amount of air/gas bubbles from the material in a shorter amount of time. The baffle may be fixed while the plate or disk rotates. This preferably results in a higher quality product than conventional systems allow.

In another aspect of the invention, the degassing system may include a dosifier located in the compartment formed by the rotating disk and fixed baffle. The dosifier may be configured as a ring and may be mounted on the rotating disk and located radially inward from the baffle. The dosifier may facilitate the thinning of the layer of material flowing radially outward along the rotating plate, thereby increasing the efficiency of the de-aeration process.

In another aspect of the invention, the system may include a perforated ring through which de-aerated material passes en route to forming an end product. The perforated ring may be coupled to the rotating disk and its perforations may be sized and/or spaced so that the material passing through its perforations reflects the properties of a desired end product.

Another aspect of the invention regards a unique shaft to which the rotating plate is mounted. Unlike many existing systems, the shaft may extend deeper into the chamber and may locate the rotating plate at an appropriate position relative to the baffle and chamber.

Another aspect of the invention regards a seal which serves as an interface between the rotating shaft and the stationary chamber. The seal preferably includes a spring component to maintain the vacuum and to avoid leakage.

In another aspect of the invention, the foregoing components may be used together to provide an efficient system and method for providing de-aerated or degassed material suitable for the desired end product. To this end, after the material is processed as described above, the material may accumulate in the chamber so that it may be removed and packaged for the desired end product.

In another aspect of the invention, the system is configured and operates so that it may be readily cleaned between de-aeration operations.

BRIEF DESCRIPTION OF THE DRAWINGS

Embodiments of the present invention will now be described, by way of example only, with reference to the following figures.

FIG. 6B(i) is a top view of a baffle.

FIG. 6B(ii) is a section view of a baffle and a feed tube.

DESCRIPTION OF THE PREFERRED EMBODIMENTS

With reference to the figures, de-aeration system 10 is described herein. Where the same or similar components appear in more than one figure, they are identified by the same or similar reference numeral. The invention is described herein with reference to viscous fluids or highly viscous fluids. However, de-aeration system 10 may be used with other fluids, liquids and combinations thereof as well as other materials, and the use of de-aeration system 10 for use with the foregoing is within the scope of the invention.

In general, de-aeration system 10 may include vacuum chamber 20 and a rotating plate or disk assembly 39 that includes plate or disk 40. De-aeration system 10 may operate by feeding material to be de-aerated into chamber 20 and onto disk 40 rotating therein. The centrifugal force of spinning plate 40 preferably causes the material to spread out in a thin layer or film thereby bringing air bubbles or other voids to the surface of the film, and exposing them to the vacuum pressure within chamber 20. The bubbles or other voids then preferably stretch and burst, and the gases released thereby are then preferably removed by the vacuum pump or through vacuum port 26.

As described in detail below, de-aeration system 10 includes several unique features that permit the material to more quickly spread out into a thinner layer on disk 40, and that provide a more efficient system for removing a greater amount of air/gas bubbles from the material. These features include rotating plate 40 that is dynamically balanced and that is dimensioned to allow a layer of material traveling radially outward to sufficiently thin; feed tube 30 having an outlet end positioned near plate surface 46 and near the center of plate 40; fixed baffle 60 and gap 66 that provide a shearing action to material passing through gap 66; dosifier ring 80 that may help thin the radially outward moving layer; exit port 26 to which the gas of removed bubbles and voids may be directed, perforated ring 50; and seal 43 that helps maintain the vacuum of chamber 20 and that avoids leakage. These features preferably result in higher quality products than conventional, existing systems.

Figure 1:
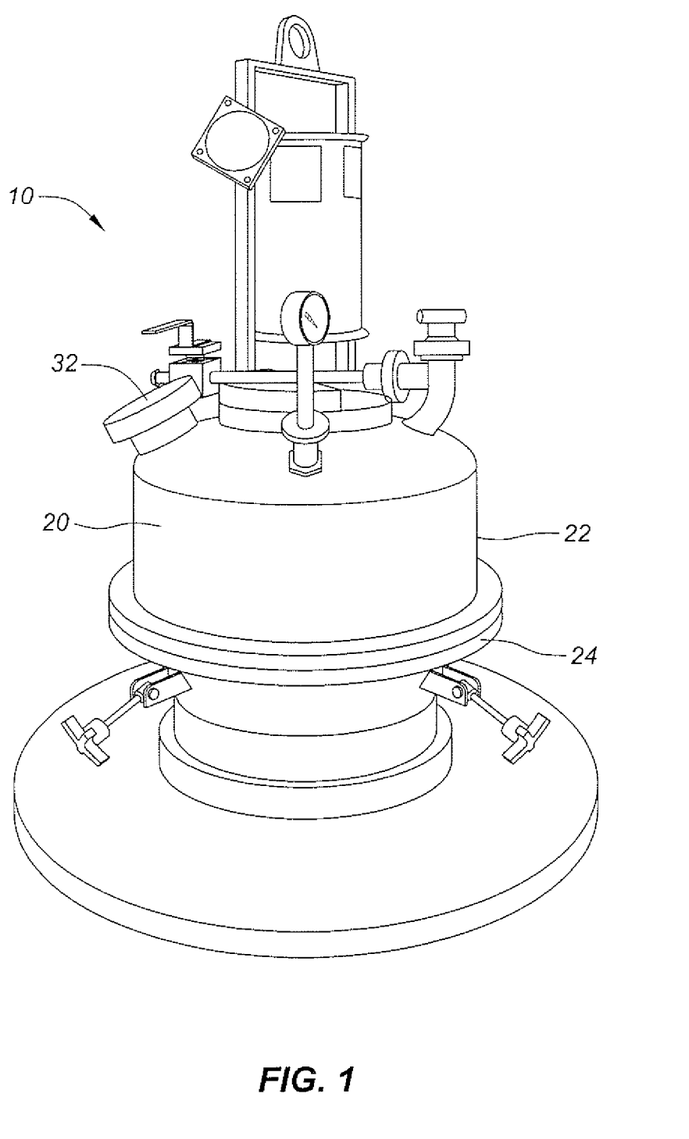
FIG. 1 is a perspective view of a de-aeration or degassing system.
Figure 2:
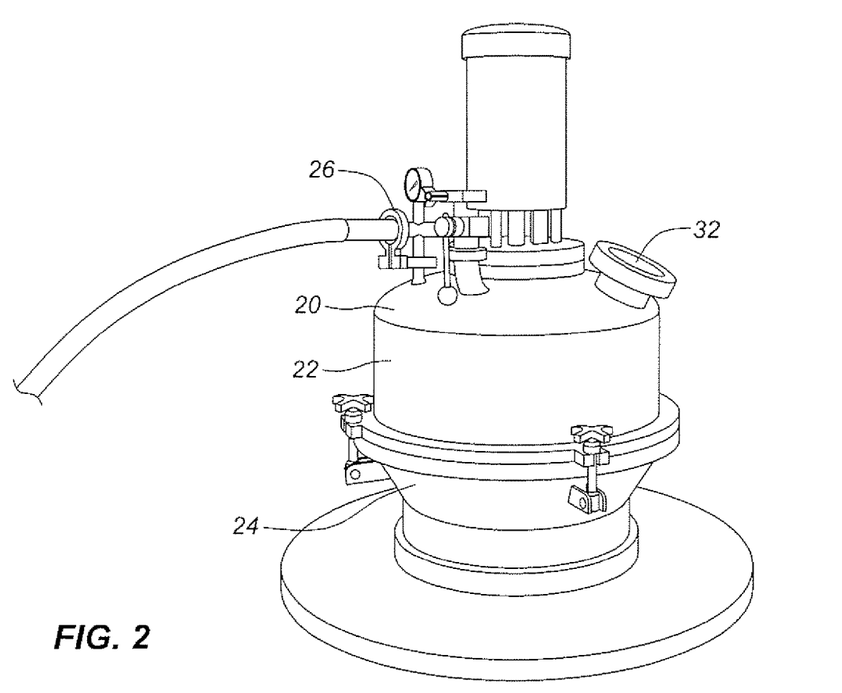
FIG. 2 is a perspective view of a de-aeration or degassing system.

FIGS. 1 and 2 are perspective views of the outside of de-aeration system 10. As shown, chamber 20 may comprise a rigid enclosure, which may include upper portion 22 and lower portion 24 that may be coupled together by bolts 23 or other suitable attachment means. Upper and lower portions 22, 24 may be detached to permit removal of de-aerated or degassed material, or to permit inspection, maintenance or cleaning of chamber 20. Chamber 20 may be formed of any suitable material, including but not limited to, stainless steel, aluminum, mild steel, brass, high density ceramic, glass, acrylic or other suitable material.

Figure 4:
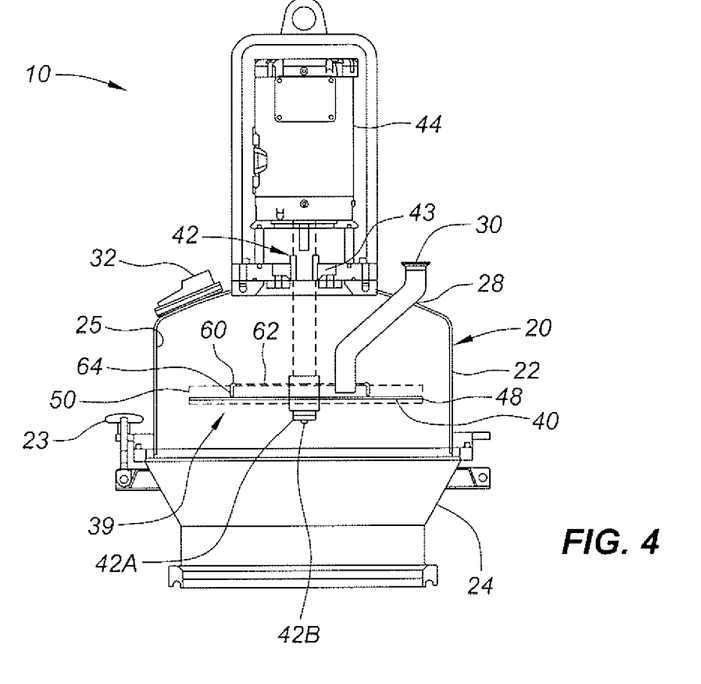
FIG. 4 is a section view of a de-aeration or degassing system.
Figure 5:
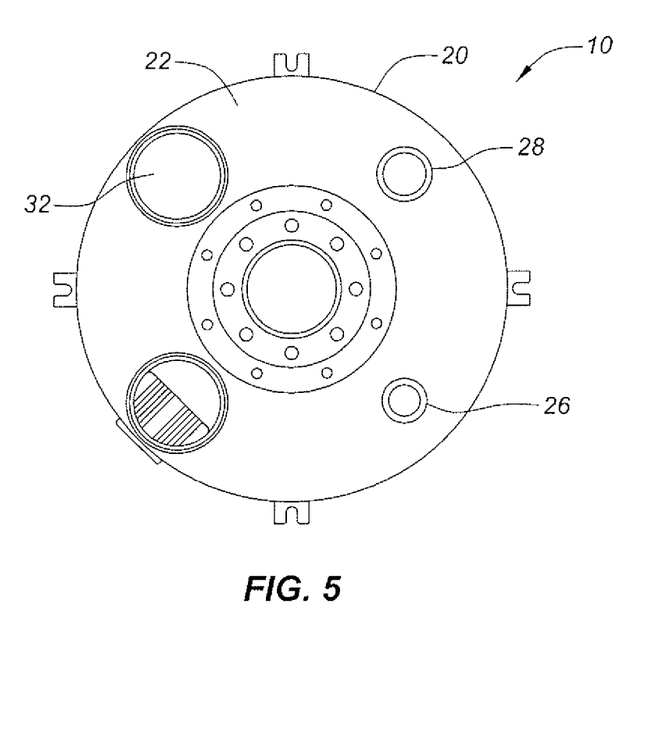
FIG. 5 is a top view of a de-aeration or degassing system.
Figure 6:
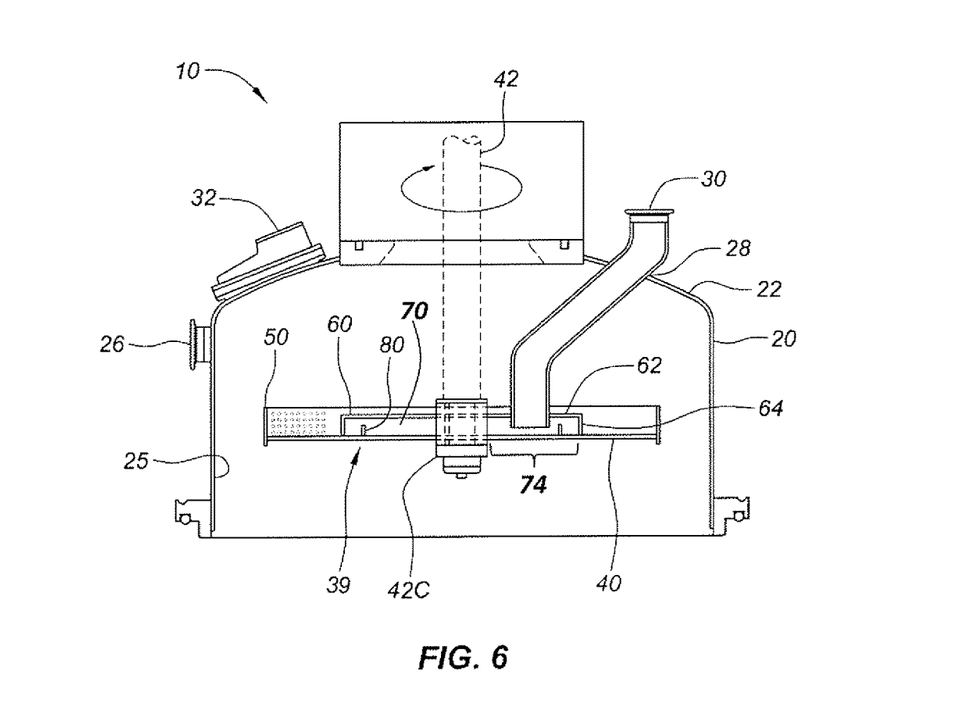
FIG. 6 is a section view of a portion of a de-aeration or degassing system.

As shown in FIGS. 4 and 6, and as discussed in more detail later, upper portion 22 may include inside wall 25, against or toward which degassed material may be directed. The degassed material may then fall to bottom portion 24 which may have a generally conical shape that may help collect degassed material as it falls downward due to gravity.

It is preferred that chamber 20 be hermetically sealed and a vacuum applied thereto so that chamber 20 forms a vacuum chamber. To this end, air and/or other gases may be removed through vacuum port 26 by a vacuum pump coupled with port 26. Seal 43, which serves as the interface between rotating shaft 42 and chamber 20, preferably provides a secure seal to help maintain the vacuum of chamber 20. As shown in the figures, the location of vacuum port 26 may vary and multiple ports 26 may be used. However, it is preferred that port(s) 26 be positioned so that the gas associated with removed bubbles and voids may be directed thereto without any or significant further interaction with the de-aerated material.

Chamber 20 may also include feed port 28 to accommodate feed tube 30 through which the material to be de-aerated may be fed into chamber 20. As discussed below, the location of tube 30 preferably aids in thinning the layer of material to be de-aerated. Chamber 20 may have one or more additional ports 32 for viewing inside chamber 20, or for installing other instruments in the walls of the chamber 20.

The diameter and/or size of chamber 20 may vary depending on the application, and the volume and/or type of material to be de-aerated. In one embodiment, the diameter of the chamber 20 may be about 20 inches, the height of upper portion 22 may be about 12 inches and the height of lower portion 24 may be about 10 inches. However, chamber 20 may assume other shapes and sizes, and the invention is not limited to the foregoing examples.

Figure 3:
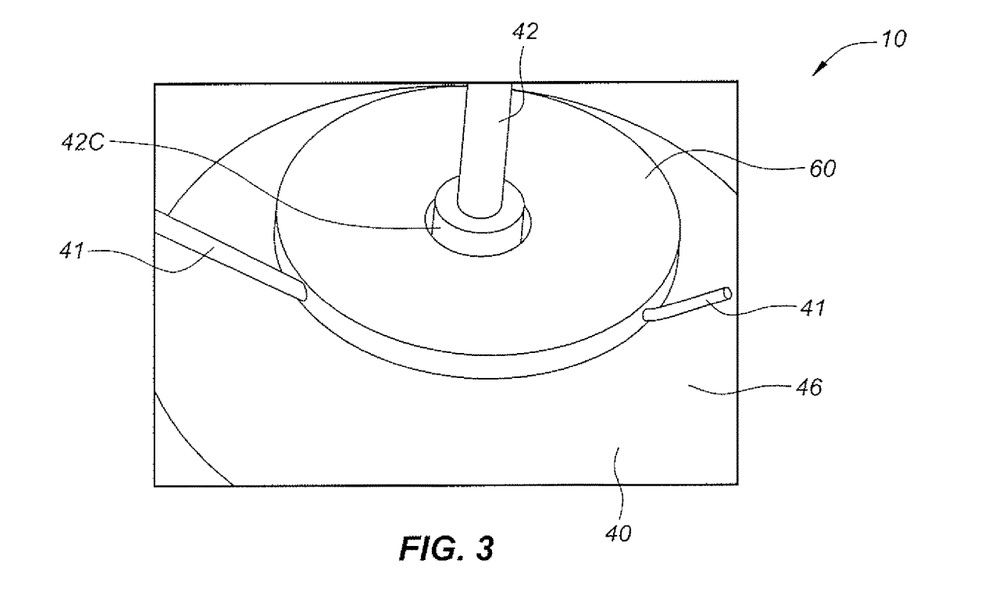
FIG. 3 is a perspective view of a rotating plate and baffle that may be located in the interior of the de-aeration system of FIG. 1.

With reference to FIGS. 3 and 4, de-aeration system 10 preferably includes disk 40 that may be attached to shaft 42 that is coupled to and rotated by motor 44. As such, disk 40 may rotate and apply centrifugal force to the material thereon. Shaft 42 may extend downward a length into chamber 20 so that disk 40 is positioned within upper portion 22.

The centrifugal force may vary with the rotational speed of shaft 42 as powered by motor 44. For example, shaft 42 may rotate at 900 RPM, though other lower and higher rotational speeds are within the scope of the current invention. To this end, higher rotational speeds may be used with higher viscosity materials that may require a higher centrifugal force to experience a sufficiently large shearing force as the material encounters baffle 60 and gap 66 as further discussed below. A higher rotational speed may also be used to yield higher production output. Lower rotational speeds may be used for lower viscosity material. In any event, it is preferred that a suitable rotation speed is used to produce an appropriate centrifugal force, to produce an acceptable yield of degassed material and to avoid clogging of gap 66.

That shaft 42 may extend down into chamber 20 represents a difference and an advantage over various prior systems. That is, many prior systems involve cones or other rotating components positioned at or near the top of their chambers so that any rotating shaft, to which such cones or other rotating components may be attached, is relatively short and does not significantly extend into the chamber. But shaft 42 of the current invention may extend downward to position rotating disk 42 in relation to chamber 20 and baffle 60 to increase degassing efficiency. Furthermore, the current invention addresses and avoids issues that would arise with a longer rotating shaft, e.g., dynamic imbalance or wobble. These are issues that are not contemplated nor addressed with prior systems.

Disk 40 may comprise stainless steel or other suitable material. It is preferred that disk 42 be dynamically balanced so that it does not cause any wobble in shaft 40 as it rotates. To this end, disk 42 may be tested under rotation to determine whether any imbalance exists, e.g., where the mass of disk varies around its area. If so, disk 42 may undergo a milling or other machining operation to decrease the mass at locations where disk 42 may be relatively heavy. Other suitable machining or other operations may be performed on disk 42 so that its mass is uniform or otherwise appropriately balanced around shaft 40.

Figures 6A, 6B, 6C, 6D:
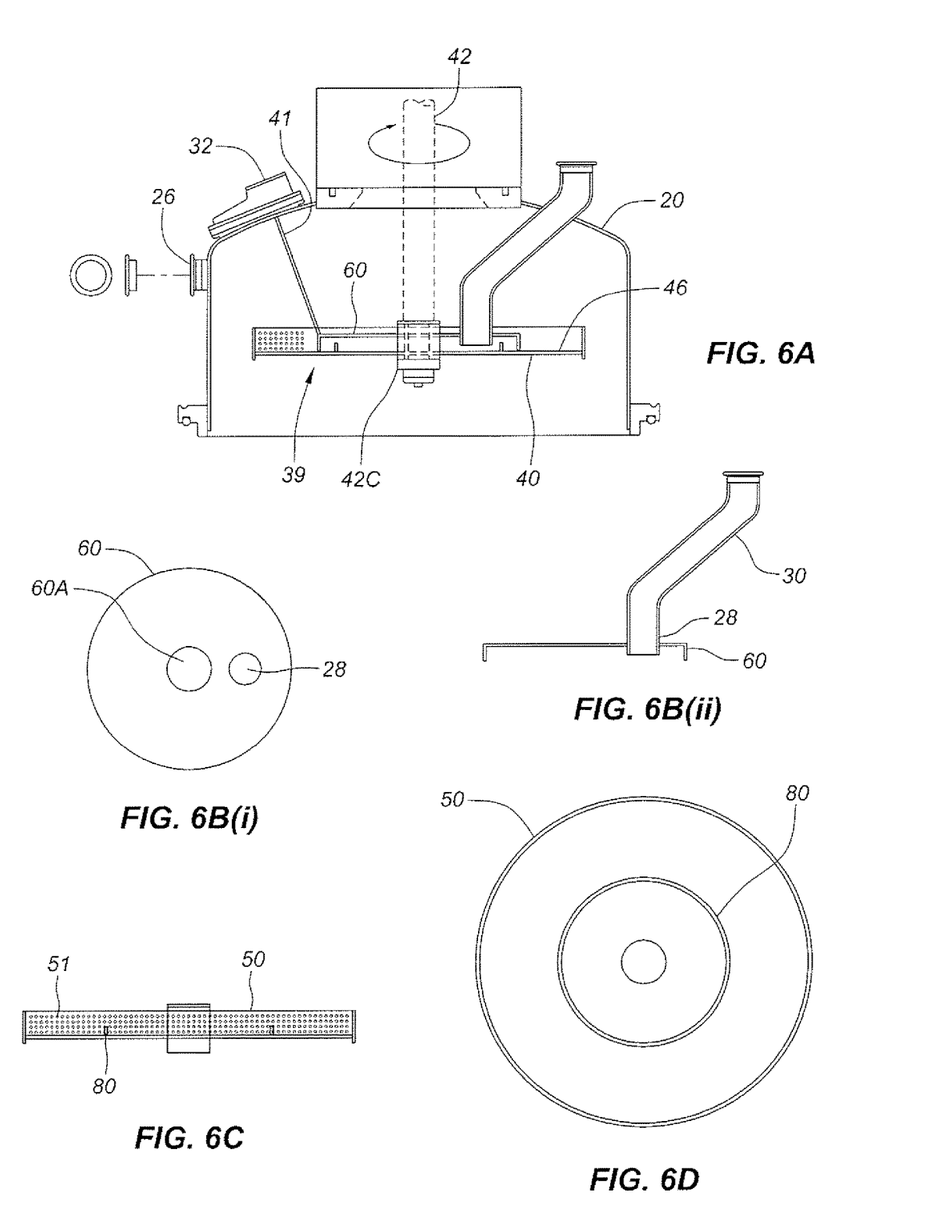
FIG. 6A is a section view of a portion of a de-aerating or degassing system.
FIG. 6C is a side view of a rotating disk assembly.
FIG. 6D is a top section view of a rotating disk assembly.

Alternatively, other components which rotate with shaft 42 may undergo a machining operation to adjust the rotating mass. For example, in the embodiments shown in FIGS. 4 and 8, plate 40 may be attached to shaft 42 by attachment or lower plate 42A by bolt 42B or other suitable fastener. In this embodiment, material from attachment plate 42B may be removed to provide rotational stability. As another example, as shown in FIGS. 3, 6 and 6A, plate 40 may be attached to shaft 42 via hub 42C. In this embodiment, material from hub 42C may be removed as needed to provide dynamic stability.

Disk 40 may have a surface 46 on which the material to be degassed is dispensed. It is preferred that disk surface 46 be smooth so that the material may readily flow radially outward, and so that the material is not caught up in surface incongruities which could cause dynamic imbalance and/or decreased degassing efficiency. To the extent that any material is removed from disk 40 for balancing purposes, it is preferred that such material is removed from the underside of disk 40.

The periphery of disk 40 may be perimeter 48. Disk 40 may have any suitable diameter, but it is preferred that it is large enough to apply centrifugal force to a sufficient volume of material to be degassed, and to allow sufficient distance for the radially outward moving layer of material to sufficiently thin. In one embodiment, the diameter of disk 40 may be about 16 inches. In another embodiment, the diameter of disk 40 may be about three-fourths (¾) the diameter of chamber 20. In any event, the diameter of disk 40 may vary and the invention is not limited to the foregoing examples.

Material feed tube 30 preferably extends downward into chamber 20 so that its outlet end is in proximity to disk surface 46, so that material to be degassed may be uniformly dispersed onto plate 40. For example, the outlet end of tube 30 may be located about 0.25" from surface 46. However, tube 30 outlet end may alternatively be located at different distances above plate 40.

It is also preferred that the outlet end of tube 30 be near the center of disk 40. This preferably provides a larger radial distance for a layer of material to thin before encountering baffle 60 as discussed below.

Disk 40 is preferably not perforated so that it may be easily cleaned after a degassing operation. It is also preferred that system 10 may be readily disassembled for cleaning purposes.

System 10 also preferably includes perforated ring or atomizer 50 that may be coupled to disk 40, such as at disk perimeter 48, and extend upwardly therefrom. In one embodiment, the height of perforated ring 50 may be about an inch or less, but other heights may be used. As shown, ring or atomizer 50 preferably includes a plurality of perforations or holes 51. The diameter, spacing and density of perforations 51 may vary depending on the application. In one embodiment, the diameter of perforations 51 may be about 0.7 to 3 mm, but other diameters and/or hole shapes may be used. Material that has passed through gap 66, as discussed below, may then be directed radially outward on disk 40 due to the centrifugal force of rotation, and may then pass through perforations 51 on ring or atomizer 50. It is preferred that perforations 51 be sized so that most of the material emanating from gap 66 may pass through perforations 51, and so that the material passing through perforations 51 have the desired properties of the end product.

Figure 8:
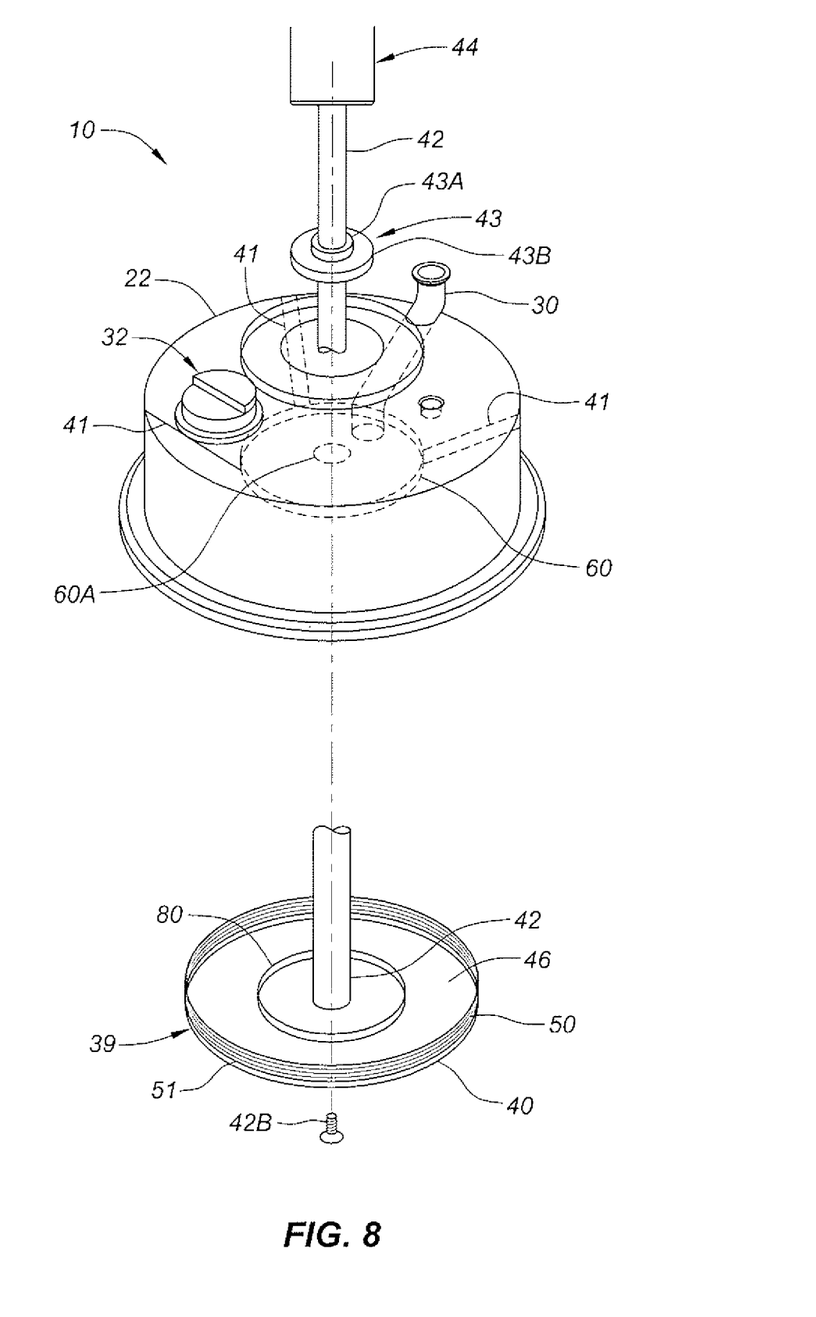
FIG. 8 is an exploded view showing certain components of a de-aeration or degassing system.

As best seen in FIGS. 4, 6A, 6B(ii) and 8, system 10 preferably includes annular baffle 60 that may be generally positioned over the central portion of disk surface 46. Baffle 60 preferably remains stationary while disk 40 rotates along with shaft 42. To this end, baffle 60 may include central hole 60A through which shaft 42 extends as shown in FIGS. 4 and 8. Alternatively, central hole 60A may be sized to accommodate adaptor or hub 42C attached to shaft 42. A suitable clearance distance preferably exists between shaft 42 (or hub 42C) and the periphery of central hole 60A, e.g., 1/16" clearance, though other distances may be used and are within the scope of the invention.

Figure 7:
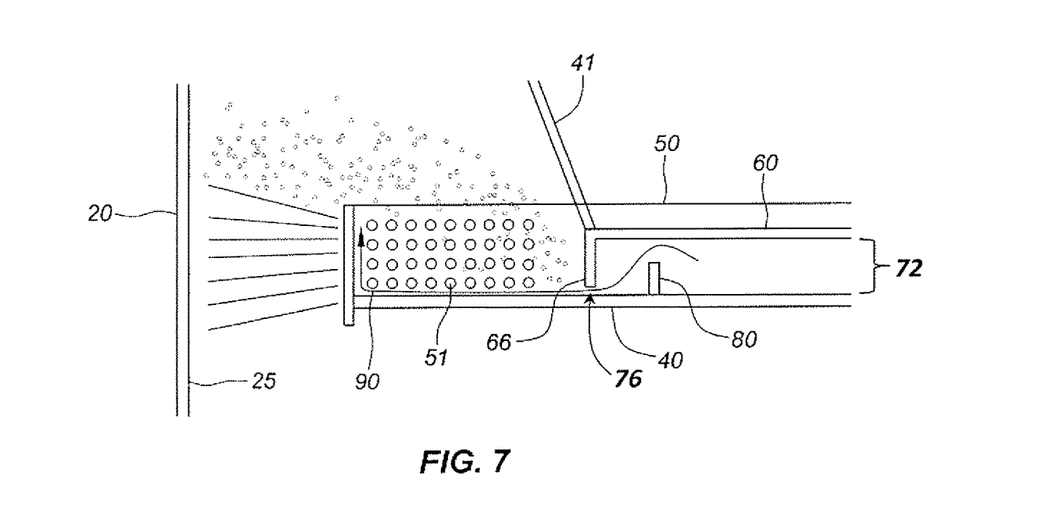
FIG. 7 is an enlarged view of a portion of the section view shown in FIG. 6, and showing a path of material to be de-aerated or degassed.

Baffle 60 may also be supported by brackets 41 which may couple baffle 60 to chamber 22 as shown in FIGS. 3, 7 and 8. Brackets 41 may comprise stainless steel or other suitable material.

Baffle 60 may include top annular portion 62 and cylindrical side wall 64 that extends downward from top portion 62 towards disk 40. As best shown in FIG. 7, gap 66 exists between the bottom edge of side wall 64 and disk 40. Baffle 60 and gap 66 preferably exert a shearing action on material as it passes through gap 66 to expose voids to the vacuum.

The top annular portion 62, cylindrical side wall 64, and annular disk 40 cooperate to form an annular, cylindrical compartment 70 with a height 72, a diameter 74, and an annular opening 76 defined by gap 66. Due to the centrifugal force of rotating disk 40, the material preferably passes through gap 66, thereby thinning and/or refining the layer or film of material and exerting a shearing force on the layer. As the material passes through gap 66, bubbles and/or other voids may rise to the top or be exposed to the surface of the layer or film for removal by the vacuum by this shearing force.

As noted above, it is preferred that the outlet end of feed tube 30 be located relatively close to plate surface 46 and near the center of plate 40. With this configuration, material may be uniformly distributed onto plate 40, and a layer of material may form on plate 40 before encountering baffle 60 and gap 66 which may help avoid clogging.

The size of compartment 70 and gap 66 may vary depending on the application and the type and volume of material to be degassed. In one embodiment, gap 66 may have a height of about 1.3 mm to about 3 mm, preferably about 2 mm. These parameters may be varied depending on the material and/or product.

Compartment 70 may have a diameter and overall size to provide the desired throughput, e.g., liters per hour. In another embodiment, compartment 70 may have a diameter of about half the diameter of disk 40. In another embodiment, compartment 70 may have a diameter of about 8 inches. In any event, baffle 60 and compartment 70 may have different dimensions and the current invention is not limited to the foregoing examples.

As noted above, baffle 60 may be fixed, or stationary, within the chamber 20, e.g., fixed by brackets 41. Upper annular portion 62 may include a second feed port 68 through which feed tube 30 may direct fluid into compartment 70 and onto disk surface 46.

As illustrated in FIGS. 6 and 7, system 10 may also include dosifier ring or wall 80 that may extend upwardly from disk surface 46 and into compartment 70. Dosifier ring 80 may be generally concentric with both the circular side wall 64 of baffle 60 and perforated ring 50 extending upwardly from the disk perimeter 48. Dosifier ring 80 preferably has a height that is less than the height of the compartment 70 so that material to be degassed may pass thereby and out of compartment 70 through gap 66.

As shown in FIG. 6, the outlet end of feed tube 30 is preferably located radially inward, or more centrally than, dosifier ring 80. Thus, as illustrated in FIG. 7, fluid to be de-aerated may be deposited onto disk surface 46 near the center of the compartment 70, and as the disk 40 rotates and the centrifugal force causes the fluid to spread outwardly toward the disk perimeter 48, de-aeration system 10 directs the fluid along a selected path 90.

In particular, rather than spreading outwardly along a straight path as occurs in conventional degassing systems, the degassing system 10 of the current invention directs the material in a somewhat tortious path 90 upwardly over dosifier ring 80 then downwardly under the cylindrical side wall 64 and through gap 66 and opening 76 while the fluid spreads outwardly. By being directed along selected path 90, the material is caused to spread out into a thinner layer or film in less time than would be required if the fluid were allowed to spread straight outwardly along the disk surface 46 as in conventional systems.

As shown in FIG. 7, by directing the material fluid to pass through opening 76 on its outward path to disk perimeter 48, the thickness of the film may be controlled as it is forced through gap 66 by the centrifugal force of rotating disk 40. As also shown in FIG. 7, as the material is deposited onto disk 40 and is directed radially outward through compartment 70, the material my be swirled between rotating disk 40 and fixed baffle 60, which itself may tend to cause air/gas bubbles to stretch, burst and be removed by the vacuum pump. This provides a smooth or gelatinous film that may then be formed into capsules. In this manner, many different material viscosities may be accommodated from very liquid to very viscous, thick materials. The control of the film layer provided by baffle 60 also helps ensure that the material is spread evenly in over the disk surface 46, which preferably minimizes any dynamic imbalance on disk surface 46.

In another embodiment, as illustrated in FIG. 4, the dosifier ring 80 may be omitted, in which case the fluid may still be directed along selected path 90 under the cylindrical side wall 64 through gap 66 and compartment opening 76 in a controlled manner contrary to conventional systems.

Upon exiting the compartment 70, the thin layer of material continues to spread even thinner as it is urged further outwardly toward the disk perimeter 48 exposing more air/gas bubbles to the surface. At the disk perimeter 48 the material passes through the perforated plate or atomizer 50 and onto the inside wall 25 of chamber 20 where in flows down to the bottom of chamber 20 and collected in an accumulation tank 92 in the lower portion 24 of chamber 20.

Gas that is associated with bubbles or voids that have been removed from the material may be directed to vacuum port 26. With this configuration, such gas does not further interact, or significantly interact, with the de-aerated material. This is an advance over existing systems where such gas may flow through de-aerated material, thereby degrading the end product.

In sum, the de-aeration system 10 and method of the current invention preferably causes the material to more quickly spread into a thinner layer of film which causes a greater amount of air/gas bubbles to be forced to the surface of the fluid, opened and removed from the fluid, in a shorter amount of time than is possible with existing de-aeration devices.

Another aspect of the current invention relating to seal 43 is now further described with reference to FIGS. 3, 8, 9 and 10. As noted earlier, seal 43 serves as the interface between rotating shaft 42 and stationary chamber 20. Seal 43 is attached to shaft 42 and rotates with shaft 42, and its sealing function also helps to maintain the vacuum of chamber 20 and to avoid leakage.

Figure 9:
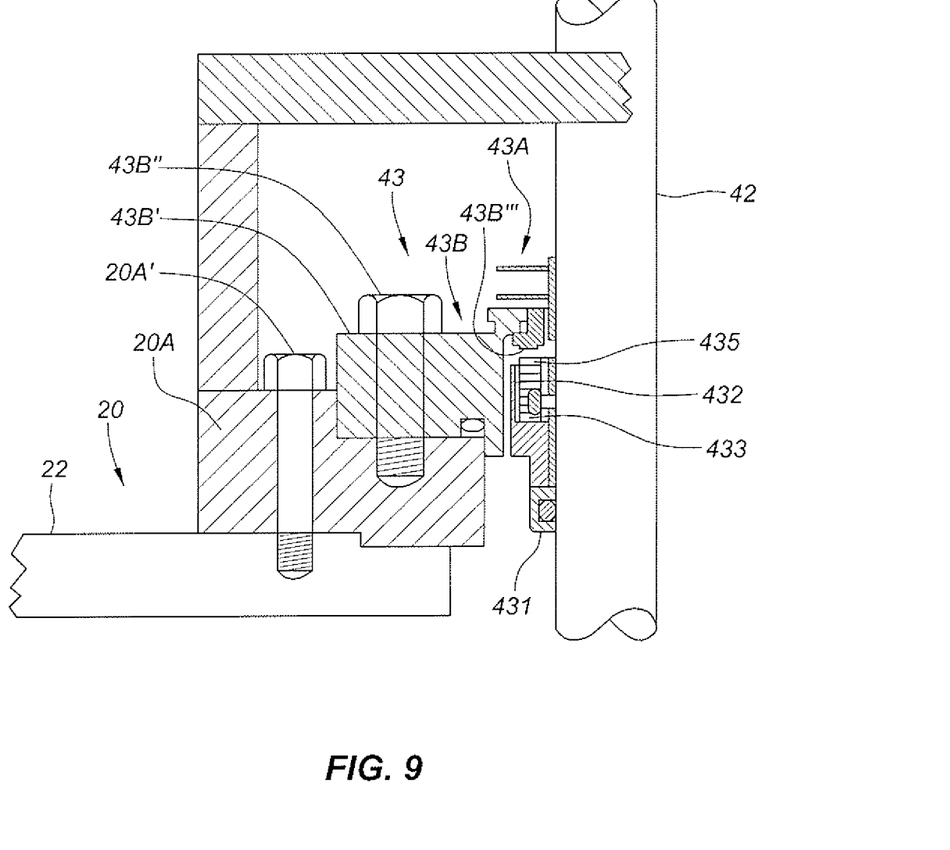
FIG. 9 is a section view of a seal and surrounding components of the system.
Figure 10:
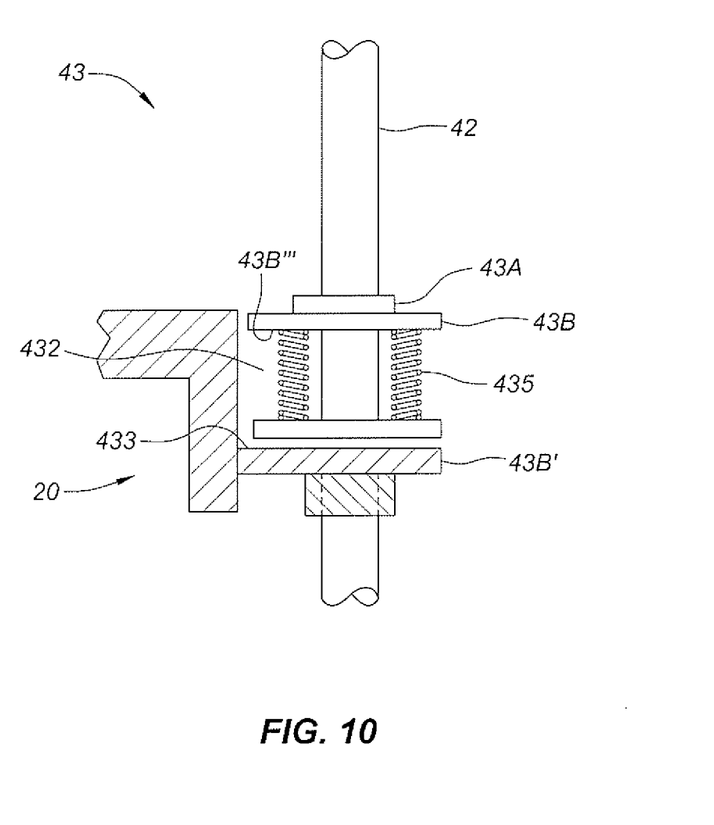
FIG. 10 is a section view of a seal and surrounding components of the system.

As shown in FIGS. 8-10, seal 43 may include inner portion 43A which rotates with shaft 42, and outer portion 43B which remains stationary with chamber 20. Inner and outer portions 43A, 43B are shown in more detail in the section view of FIG. 9, which shows part of seal 43 existing to one side of shaft 42. It is to be understood that seal 43 surrounds shaft 42 and that the components shown in FIG. 9 extend around shaft 42 as shown in FIG. 10.

Outer portion 43B may include housing 43B' which may be attached to housing block 20A via bolt 43B" or other suitable attachment. The foregoing may then be attached to upper portion 22 of housing 20 via bolt 20A' or other suitable fastener.

Inner portion 43A may include sleeve 431 which engages rotating shaft 42 and rotates therewith. Sleeve 431 may include annular chamber 432. At the bottom of chamber 432, a stationary surface 433 may exist. Surface 433 may engage sleeve 431 directly or through other suitable means. The top end of chamber 432 may be open to downward surface or shoulder 43B''' that may be part of outer portion housing 43B'. Chamber 432 may house spring 435 that may be loaded in compression with its ends engaging surface 433 and shoulder 43B'''. Spring 435 may extend around shaft 42 in annular chamber 432. In this configuration, spring 435 may exert a downward force on sleeve 431. This in turn helps keep seal 43 closed so as to maintain the vacuum of chamber 20 and to also avoid leakage.

It is preferred that the stiffness or spring constant is sufficiently high to exert a sufficiently large downward force on sleeve 431. To this end, different spring constants may be used depending on the size of system 10 and its components.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A system for de-aerating material, comprising:
   a vacuum chamber;
   a plate that is configured to rotate and that is positioned within the vacuum chamber; and
   a stationary baffle that includes a top wall, that covers a portion of the plate and that is separated from the plate by a gap; and
   a dosifier ring that extends upwardly from the plate and that is positioned under the stationary baffle;
   wherein the material to be de-aerated is fed onto the plate between the plate and the stationary baffle as the plate rotates; and
   wherein the material is directed radially outward through the gap.

2. The de-aeration system of claim 1, wherein the centrifugal force of the plate as it rotates directs the material radially outward along a selected path passing by the dosifier ring and through the gap.

3. The de-aeration system of claim 2, wherein the selected path is a tortious path.

4. The de-aeration system of claim 1, further comprising a perforated ring mounted to the plate at a location that is radially outward from the stationary baffle.

5. The de-aeration system of claim 1, further comprising:
   a compartment formed between the plate and the stationary baffle; and
   a feed tube configured to provide material to the compartment.

6. The de-aeration system of claim 1, wherein the gap serves to control the thickness of the material on the plate as the material is directed radially outward beyond the stationary baffle.

7. The de-aeration system of claim 1, further comprising a shaft that extends downward into the vacuum chamber and that is configured to rotate, wherein the plate is attached to the shaft.

8. The de-aeration system of claim 7, further comprising a seal that rotatably couples the shaft to the vacuum chamber.

9. The de-aeration system of claim 8, wherein the seal includes a spring that exerts a downward force on the shaft.

10. The de-aeration system of claim 1, wherein the plate is dynamically balanced.

11. The de-aeration system of claim 10, further comprising an attachment plate coupled to the plate, wherein material comprising the attachment plate is removed to dynamically balance the plate.

12. The de-aeration system of claim 1, wherein the top wall of the stationary baffle includes a downward extending lip and the gap exists between the lip and plate.

13. The de-aeration system of claim 12, wherein material passing through the gap experiences a shearing force from the lip.

14. A system for de-aerating material, comprising:
   a vacuum chamber;
   a shaft that extends downward into the vacuum chamber and that is configured to rotate;
   a seal that rotatably couples the shaft to the vacuum chamber;
   a plate that is attached to the shaft and that is configured to rotate with the shaft;
   a stationary baffle that includes a top wall, that is positioned above the plate and that is separated from the plate by a gap; and
   a dosifier ring that extends upwardly from the plate and that is positioned under the stationary baffle;
   wherein the material to be de-aerated is fed onto the plate between the plate and the stationary baffle as the plate rotates; and
   wherein the material is directed radially outward through the gap.

15. The de-aeration system of claim 14, wherein the seal includes a spring that exerts a downward force on the shaft.

16. The de-aeration system of claim 14, wherein the plate is dynamically balanced.

17. The de-aeration system of claim 14, wherein the top wall of the stationary baffle includes a downward extending lip and the gap exists between the lip and plate.

18. The de-aeration system of claim 17, wherein material passing through the gap experiences a shearing force from the lip.

19. The de-aeration system of claim 14, further comprising a feed tube that delivers material to the plate between the center of the plate and the dosifier ring.

20. A system for de-aerating material, comprising:
   a vacuum chamber;
   a shaft that extends downward into the vacuum chamber and that is configured to rotate;
   a seal that rotatably couples the shaft to the vacuum chamber and that includes a spring that exerts a downward force on the shaft;
   a plate that is attached to the shaft and that is configured to rotate with the shaft;

a stationary baffle that includes a top wall with a downward extending lip that is positioned above the plate, wherein the downward extending lip is separated from the plate by a gap;

a dosifier ring that extends upwardly from the plate and that is positioned under the stationary baffle;

a feed tube that delivers material to the plate between the center of the plate and the dosifier ring; and a perforated ring mounted to the plate at a location that is radially outward from the stationary baffle;

wherein the material to be de-aerated is fed onto the plate between the plate and the stationary baffle as the plate rotates; and wherein the material is directed radially outward through the gap.

* * * * *